us006837917B2

United States Patent
Karwacki et al.

(10) Patent No.: US 6,837,917 B2
(45) Date of Patent: Jan. 4, 2005

(54) PROCESS FOR THE REMOVAL OF ETHYLENE OXIDE FROM AIR

(75) Inventors: Christopher A. Karwacki, Middletown, OH (US); Joseph A. Rossin, Columbus, OH (US)

(73) Assignee: Guild Associates, Inc., Dublin, OH (US)

( * ) Notice: Subject to any disclaimer, the term of this patent is extended or adjusted under 35 U.S.C. 154(b) by 0 days.

(21) Appl. No.: 10/443,292

(22) Filed: May 22, 2003

(65) Prior Publication Data

US 2004/0231511 A1 Nov. 25, 2004

(51) Int. Cl.[7] .............................................. B01D 53/04
(52) U.S. Cl. ............................ 95/128; 95/143; 95/144; 95/902; 423/237; 423/239.2; 423/245.1
(58) Field of Search .................. 95/128, 141, 143, 95/144, 902; 423/237, 239.2, 245.1

(56) References Cited

U.S. PATENT DOCUMENTS

| 2,156,341 | A | * | 5/1939 | Langwell et al. ............ 549/538 |
| 2,172,025 | A | * | 9/1939 | Langwell et al. ............ 549/542 |
| 2,325,577 | A | * | 7/1943 | Balcar .......................... 95/92 |
| 3,531,246 | A | * | 9/1970 | Matsen ......................... 502/64 |
| 3,702,886 | A |   | 11/1972 | Argauer et al. .............. 423/328 |
| 3,732,326 | A | * | 5/1973 | Chen ............................ 585/820 |
| 4,019,879 | A | * | 4/1977 | Rabo et al. ................... 95/140 |
| 4,554,141 | A | * | 11/1985 | Scull et al. .................... 95/144 |
| 4,612,026 | A |   | 9/1986 | Pollara et al. ................. 55/274 |
| 4,813,410 | A |   | 3/1989 | Kruse et al. ........... 128/205.27 |
| 4,828,810 | A | * | 5/1989 | Kruse et al. .............. 423/245.1 |
| 5,271,914 | A | * | 12/1993 | Sugimoto et al. .............. 95/141 |
| 5,711,926 | A | * | 1/1998 | Knaebel ....................... 423/359 |
| 5,741,470 | A | * | 4/1998 | Wenzler ................... 423/245.2 |
| 5,744,686 | A | * | 4/1998 | Gajda .......................... 585/823 |
| 5,846,298 | A | * | 12/1998 | Weist, Jr. ...................... 95/138 |
| 6,001,320 | A | * | 12/1999 | Addiego ................... 423/239.2 |
| 6,002,019 | A | * | 12/1999 | Tamhankar et al. .......... 549/258 |
| 6,042,797 | A | * | 3/2000 | Ogawa et al. ............ 423/213.2 |
| 6,074,973 | A | * | 6/2000 | Lampert et al. ............... 502/60 |
| 6,099,619 | A | * | 8/2000 | Lansbarkis et al. ............ 95/118 |
| 6,319,484 | B1 | * | 11/2001 | Shore et al. .............. 423/245.1 |
| 2003/0172809 | A1 | * | 9/2003 | Speth ........................... 95/128 |
| 2004/0094035 | A1 | * | 5/2004 | Adamczyk et al. ............ 95/117 |

* cited by examiner

Primary Examiner—Robert H. Spitzer
(74) Attorney, Agent, or Firm—Baker Botts L.L.P.

(57) ABSTRACT

A process for removal of ethylene oxide (EO) from ambient air laden with EO is passed through a zeolite-based removal media, which preferably consists of the acid form of zeolite ZSM-5, herein referred to as "H-ZSM-5." The process described herein may be applied to many forms, configurations and uses, such as, for example, gas masks, fume hood ventilation filters, cartridge filters, etc. Preferably, the H-ZSM-5 is configured within an apparatus in such a manner that the stream containing EO is brought into sufficient contact with the zeolite to remove the EO from the airstream.

9 Claims, No Drawings

US 6,837,917 B2

PROCESS FOR THE REMOVAL OF ETHYLENE OXIDE FROM AIR

TECHNICAL FIELD OF THE INVENTION

The present invention relates to a process for the removal of ethylene oxide (hereinafter "EO") from streams of air using a zeolite-based media.

BACKGROUND OF THE INVENTION

Ethylene oxide ("EO") is highly toxic. The US Department of Labor Occupational Safety and Health Administration ("OSHA") has set stringent guidelines aimed at protecting workers performing operations in an environment potentially contaminated with EO. The Permissible Exposure Limit ("PEL") for EO has been established at 1.8 mg/m$^3$ (approximately 1 ppm). As a result, effective, low cost means of removing EO from ambient streams of air are needed.

Impregnated, activated carbon is known to strongly adsorb a wide variety of organic chemicals from ambient air streams. Impregnated, activated carbon does not, however, function well under conditions of high relative humidity, (hereinafter "RH") such as for example greater than about 70 to 80% RH. This is because under conditions of high RH, water vapor is adsorbed by the activated carbon, filling the pores and thereby greatly reducing the adsorption capacity for organic chemical such as EO.

Kruse and Hammer (U.S. Pat. No. 4,813,410) disclose an acidified resin capable of filtering EO. Although the acidified resin is able to very effectively filter EO at up to 50% RH, the performance of the material begins to decrease as the RH is increased past 50%. Although details are not provided, the authors report a decrease in performance as the RH is increased beyond 50%, and "unsatisfactory" performance at 85% RH.

Pollara and Liddle (U.S. Pat. No. 4,612,026) report the use of activated carbon impregnated with copper, silver and chrome employed in a filter to remove EO from streams of air. The authors report that the filter is able to effectively remove EO to sub ppm levels, however, process conditions such as flow rates, atmospheric temperature and atmospheric relative humidity are not provided.

Depending on the environment and environmental conditions, the water content associated with ambient air can vary over a wide range, from less than about 10% to greater than about 80% relative humidity (RH). Although a number of media, such as, for example, activated carbon and resins, are capable of removing EO from dry air, these materials fail to effectively filter EO under conditions where the relative humidity is high (U.S. Pat. No. 4,813,410). Therefore a need exists for a method to remove EO from ambient humid air streams.

SUMMARY OF THE INVENTION

The present invention, according to one embodiment, comprises a process for removing ethylene oxide from air over a wide range of ambient temperatures and relative humidity conditions, said process comprising contacting the air with a zeolite for a sufficient time to remove ethylene oxide. The preferred process of the present invention uses the preferred zeolite, "H-ZSM-5," to remove EO from ambient humid air.

According to another embodiment, the present invention comprises a process for the removal of EO, ammonia, and/or formaldehyde from air over a wide range of ambient temperatures and relative humidity conditions, said process comprising contacting the air with a zeolite for a sufficient time period to remove ethylene oxide, ammonia, and/or formaldehyde, said zeolite preferably being impregnated with a compound selected from the group consisting of sulfates, fluorides, chlorides, nitrates, organic acids, and mixtures thereof.

DETAILED DESCRIPTION OF THE PREFERRED EMBODIMENTS

The present invention relates, according to our embodiment, to processes for removing EO from ambient air streams over a wide RH range, e.g., from less than 15% to greater than 80% relative humidity at temperatures of about 75±50° F. According to one embodiment of the present inventive process, the ambient air stream containing EO is passed through a filtration device in a manner that allows for contacting the EO contaminated process stream with a zeolite, preferably, H-ZSM-5. EO is removed from the ambient air stream via adsorption of EO into the pores of the zeolite followed by chemical reaction. The filtration device employing the zeolite may take on many shapes and geometric forms depending upon the application, so long as the filtration device promotes contact between the stream being treated and the zeolite. The linear velocity by which the EO contaminated air stream passes through the zeolite, e.g., filter bed, will be a function of many parameters, such as, for example, the bed depth, the ambient concentration of EO, flow rate, etc. Examples of filtration devices which may utilize the present invention include but are not limited to, for example, gas mask canisters, respirators, filter banks such as those employed in fume hoods, ventilation systems, etc. A blower motor, fan, etc. may be used as a means of forcing ambient air through the device, if desired.

The acidified zeolite of the present invention functions effectively at water contents of the ambient air between about 5% and about 95% relative humidity (RH). At RH below about 5%, insufficient water may be present in the process stream to effectively remove EO. As the RH is increased above 95%, the effectiveness of the removal media becomes less than optimum. Should the RH fall below the specified range, water may be added to the process to increase the RH. Alternatively, should the RH level be too high (greater than about 95% RH), the ambient stream may be mildly heated to decrease the RH. The temperature of the ambient air ranges from about −25° F. to about 125° F. The contact time between the zeolite and the ambient air stream being treated can vary greatly depending on the nature of the application, such as for example, the desired filtration capacity, flow rates and concentration of EO in the ambient air stream. However, in order to achieve a threshold level of EO removal, the contact time (e.g., bed depth divided by the linear velocity) should be greater than about 0.025 seconds. A contact time of greater than 0.2 seconds is preferred for most applications, and a contact time of greater than 0.5 seconds is even more preferred for applications involving high concentrations of EO, or for applications where it is desired to achieve a high EO capacity in, e.g., a filter bed.

Preferably, the zeolite of the present invention is employed in an acid form. The preferred zeolite of the present invention, ZSM-5, may be purchased from commercial sources, such as for example UOP. Alternatively, ZSM-5 may be synthesized using techniques known to one skilled in the art. Preparation of ZSM-5 was first reported in U.S. Pat. No. 3,702,886. ZSM-5 is a high silica zeolite consisting of a series of interconnecting parallel and sinusoidal channels approximately 5.8 A in diameter (Szostak, Molecular Sieves: Principles of Synthesis and Identification, 1989, p.14, 23–25). ZSM-5 is a member of the pentisil family of zeolites which includes zeolitic materials whose structure consists of 5-membered rings. Additional zeolites belonging to the pentisil family include ZSM-8, ZSM-11, etc. ZSM-5 can be prepared with a range of $SiO_2/Al_2O_3$ ratios, from greater than or equal to about 10,000 to less than or equal to about 20. Because of its high silica content and small pores, ZSM-5 is hydrophobic, adsorbing a relatively small amount of water under high RH conditions. Acidification of ZSM-5 is performed using techniques well known to one skilled in the art, such as for example ion exchange. Acidification of ZSM-5 provides the necessary acid sites to catalyze the hydrolysis of EO. As prepared, ZSM-5 is a powder consisting of crystals typically less than about 50 μm in length. As prepared ZSM-5 is generally neutral or mildly basic. Acidification of ZSM-5 is typically accomplished through cation exchange reactions using techniques known to one skilled in the art. For example, cation exchange may be performed by slurrying as-synthesized ZSM-5 powder in water, heating the water to about 50° C. to about 80° C., then adding an ammonium salt solution, such as for example ammonium chloride, ammonium bisulfate, etc., to the slurry. After slurrying, the cation exchanged ZSM-5 is filtered from the solution, dried and calcined at an elevated temperature, such as for example 550° C. Calcination of the zeolite results in decomposition of the ammonium complex, resulting in a proton as the charge balancing cation; whereby the proton constitutes the acid site.

The aluminum content of the ZSM-5 employed in this invention will greatly affect the performance of the resulting EO removal media. For example, acidified ZSM-5 containing a minimal amount of aluminum ($SiO_2/Al_2O_3$ greater than about 1,000) will not effectively filter EO because of the small number of acid sites. Therefore, it is desired that the $SiO_2/Al_2O_3$ ratio of the ZSM-5 employed in this application be less than about 200, with the preferred $SiO_2/Al_2O_3$ ratio between about 90 and about 30.

As-synthesized and subsequent ion exchange, H-ZSM-5 exists as small crystals. According to various embodiments of the present invention, the zeolite may be configured in the form of particles, rings, cylinders, spheres, etc. Alternatively, the zeolite, e.g., H-ZSM-5, may be configured as a monolith, or coated onto the walls of a ceramic material, such as for example honeycomb corderite. Failure to configure the zeolite (e.g., H-ZSM-5 crystals) as described above will result in excessive pressure drop across the filtration media. Configuring the zeolite, preferably H-ZSM-5 crystals, into various geometrical shapes can be performed using operations well known to one skilled in the art. These techniques include pilling, extruding, etc. Binders, such as for example clays, silicates, plastics, etc., may or may not be required for the given application; however, the use of binders in the formation of zeolite rings, particles, etc., is preferred.

The acidified forms of zeolites of the pentisil family, such as, for example H-ZSM-8, H-ZSM-11, etc. are also within the scope of the present invention. However, ZSM-5 is the preferred zeolite.

Often times, it is desired that the removal material be capable of removing a range of chemicals from streams of air, such as for example epoxides, basic chemicals, etc. Because the novel process described herein is able to filter EO, and epoxide, the novel process can also be applied to the removal of additional epoxides, such as for example propyleneoxide, etc. Further, because the novel process described herein employs acid sites to remove EO, the novel process can also be applied to the removal of basic chemicals; such as, for example ammonia, from streams of air. Further, the novel process can be applied to multi-use applications, such as for example applications requiring the removal of multiple epoxides, or removal of EO plus additional basic chemicals from streams of air.

Should it be desired that the novel process described herein be employed in a multi-use application, such as for example a process requiring the removal of EO and $NH_3$, a preferred process will involve use of H-ZSM-5 particles prepared using an acidified binder material, or particles that are impregnated with acids or acid precursors, such as for example sulfuric acid, hydrochloric acid, ammonium bisulfate, ammonium chloride, ammonium fluoride, ammonium nitrate, citric acid, formic acid, etc. Acidification of binder material can be performed using techniques known to one skilled in the art, such as for example impregnating the preferred H-ZSM-5 particles with ammonium bisulfate, ammonium chloride, etc. solutions, followed by calcination at an elevated temperature sufficient to decompose the ammonium complex. Organic acids, such as for example citric acid, can also be impregnated into the zeolite particles. Such a treatment will result in zeolite particles with an acidic binder, with the acidity of the binder resulting from the presence of for example sulfate, chloride, etc. Alternatively, the binder material can be acidified through the addition of acid precursors to the binder, such as for example the addition of aluminum sulfate to the binder. Additionally, basic chemical filtration performance can be added to the particles via impregnation with metal sulfates, chlorides, etc.

EXAMPLES

Laboratory scale tests were performed to evaluate the ability of the present inventive zeolite to remove EO from ambient air streams. A description of the laboratory scale test stand follows: A stream of compressed air delivered from a mass flow controller is delivered to a water sparger located within a temperature controlled water bath. A second stream of compressed, dry air (dew point temperature less than about minus 20° F.) is delivered from a second mass flow controller and is blended with the humid air stream from the water sparger. The water content of the air stream is controlled by controlling flow rates of the two process streams. An RH meter is located downstream of the point where the dry air stream and humid air stream are mixed. The RH meter is used to measure and record the humidity of the air stream. An EO/air mixture delivered from a mass flow controller is blended with the process stream downstream of the RH meter. The resulting EO/humid air stream is delivered to the filtration test assembly. The filtration test assembly consists of a glass tube fitted with a small mesh screen sufficient to support the bed of filtration material. A portion of the effluent stream is delivered to an IR analyzer used to quantitatively determine the concentration of EO in the filter effluent stream. A portion of the feed stream is delivered to a second IR analyzer used to quantitatively determine the concentration of EO in the feed stream during the run.

When performing tests under conditions of high RH, the zeolite was pre-humidified overnight in an environmental chamber at 27° C., 80% RH. All tests were performed at 80° F. at either 15% RH or 80% RH. All breakthrough times are reported corresponding to an effluent EO concentration of 1.8 $mg/m^3$.

Example I (Comparative)

CWS carbon having a surface area of 1,200 $m^2/g$ was obtained from Calgon Carbon Corporation (Pittsburgh, Pa.)

as 12×30 mesh granules. 100 g of the granules were dried in an oven at 110° C. overnight, then impregnated to incipient wetness using an 8% $H_2SO_4$/water solution. The resulting material was then dried in a forced convection oven overnight at 110° C. Product material had a sulfate content of nominally 10% by weight.

15 cm$^3$ of the 10% $SO_4$/CWS material was placed in the filter tube as described above. The bed depth was 2.0 cm. The material was challenged with 1,000 mg/m$^3$ EO in 15% RH air at a linear velocity of 6 cm/s (contact time=0.33 seconds). The EO breakthrough time was 187 minutes.

The above test was repeated using an additional 15 cm$^3$ of the 10% $SO_4$/CWS. The material was pre-humidified overnight at 27° C., 80% RH. Following pre-humidification, the moisture pick-up of the material was determined to be 0.3 g of water per g of material. The pre-humidified material was challenged with 1,000 mg/m$^3$ EO in humid air (27° C., 80% RH) at a linear velocity of 6 cm/s (contact time=0.33 seconds). The EO breakthrough time was 1.5 minutes.

The above example demonstrates the inefficiency of acidified carbon to filter EO under conditions of high RH.

Example II

ZSM-5 with a $SiO_2/Al_2O_3$ ratio of 45 was prepared by combining 1,200 g of colloidal silica solution (Ludox AS-40, 40 wt % $SiO_2$) with 131 g of tetrapropylammonium bromide dissolved in 350 ml of DI water. To this mixture was added a solution consisting of 125 g of sodium hydroxide and 29 g of sodium aluminate. The resulting solution was thoroughly mixed, then added to two, 2-liter Teflon lined autoclaves. The autoclaves were placed within a forced convection oven at 180° C. for 3 days. Upon completion, the resulting material was removed from the autoclaves, filtered and washed to neutrality. Resulting material was then calcined at 650° C. for 6 hours in order to remove the organic cation. Product ZSM-5 was in the form of a powder consisting of approximately 2 μm particles.

Product ZSM-5 was acidified by ion exchange with ammonium chloride. 180 g of product ZSM-5 was slurried in a 1 liter glass beaker containing 550 ml of deionized water. The slurry was heated to 80° C. A second solution consisting of 8.53 g of ammonium chloride dissolved in 80 ml DI water was added dropwise to the slurry. Following 4 hours, the ZSM-5 was filtered from the slurry, dried and calcined at 550° C. for 4 hours. The above ion exchange procedure was repeated a second time. The acidity of the ion exchanged H-ZSM-5 was verified by slurrying 1 g of calcined ZSM-5 in 50 ml of deionized water. The pH of the resulting slurry was 4.2.

153 g of the powdered H-ZSM-5 from above was mixed with 115 g of colloidal silica (Ludox AS-40, 40 wt % $SiO_2$) for the purpose of preparing particles of H-ZSM-5, with the colloidal silica serving as a binder. The resulting paste was dried at 80° C., then calcined at 450° C. for 2 hours. The resulting material was then crushed and sieved to 12×30 mesh particles. 15 cm$^3$ of 12×30 mesh particles of H-ZSM-5 described above was placed in the filter tube as described previously. The bed depth was 2.0 cm. The material was challenged with 1,000 mg/m$^3$ EO in dry air (15% RH) at a linear velocity of 6 cm/s (contact time=0.33 seconds). The EO breakthrough time was greater than 180 minutes.

The above test was repeated using an additional 15 cm$^3$ of the 12×30 mesh particles of acidified ZSM-5. The bed depth was 2.0 cm. The material was pre-humidified overnight at 27° C., 80% RH. Following pre-humidification, the material picked up approximately 0.07 g of water per g of material. The pre-humidified material was challenged with 1,000 mg/m$^3$ EO in humid air (27° C., 80% RH) at a linear velocity of 6 cm/s (contact time=0.33 seconds). The EO breakthrough time was 130 minutes.

The above test demonstrates the ability of H-ZSM-5 to filter EO under conditions of low and high humidity.

Example III

Commercial ZSM-5 was purchased from UOP (product AE-10) as crystals. Product AE-10 was calcined at 600° C. for 6 hours as per manufacturer's instructions to produce the acid form of the zeolite. Following calcination, 1.0 g of AE-10 was slurried in 50 ml of DI water. The pH of the slurry was determined to be 3.50. Calcined AE-10 particles were prepared by adding 886 g of calcined AE-10 to a 1 gallon pail. A solution was next prepared by adding 997 g of zirconium oxynitrate (20% by weight $ZrO_2$) and 100 g of Ludox AS-40 colloidal silica solution (40% by weight $SiO_2$) to a 1 liter beaker. The resulting solution was mixed, then added to the calcined AE-10 along with 38.0 g of Catapal D pseudo-boehmite (70% by weight $Al_2O_3$). The resulting dough was kneaded by hand, then dried at 70° C. Following drying, the resulting material was calcined at 550° C. for 4 hours. Following calcination, the material was crushed and sieved to 20×40 mesh particles, then wet-sieved to remove fines and dried at 110° C. The density of the resulting material was 0.71 g/cm$^3$. The pH of the resulting particles was recorded by slurrying 1.0 g of particles in 50 ml DI water. The pH of the resulting slurry was 4.3, indicating that the resulting particles were acidic. 7.5 cm$^3$ of the 20×40 mesh particles of H-ZSM-5 described above were placed in the filter tube as described previously. The bed depth was 1.0 cm. The material was pre-humidified overnight in an environmental chamber at 27° C., 80% RH. Moisture pick-up by the material following pre-humidification was less than 0.1 g moisture per g material. Following pre-humidification, the particles were challenged with 1,000 mg/m$^3$ EO at 27° C. in 80% RH air at a linear velocity of 6 cm/s (contact time=0.33 seconds). The EO breakthrough time was 95 minutes.

7.5 cm$^3$ of the 20×40 mesh particles of H-ZSM-5 described above were placed in the filter tube as described previously. The bed depth was 1.0 cm. The particles were challenged with 1,000 mg/m$^3$ $NH_3$ at 27° C. in 15% RH air at a linear velocity of 6 cm/s (contact time=0.33 seconds). The $NH_3$ filtration test was performed under conditions of low RH because these conditions represent a greater challenge to the filtration media, due to the solubility of $NH_3$ in water. The $NH_3$ breakthrough time (to 35 mg/m$^3$) was 46 minutes.

Example IV 50.0 g of 20×40 mesh ZSM-5 particles prepared in Example III were impregnated to incipient using 50.0 ml of a solution prepared by dissolving 4.05 g of $(NH_4)_2SO_4$ (ammonium bisulfate) in 50 ml of DI water. The resulting material was dried at 70° C., then calcined at 550° C. for 3 hours in order to decompose the ammonia salt. The resulting material had a nominal sulfate content of 6*.

The resulting 6% $SO_4$/H-ZSM-5 particles were evaluated for their ability to remove EO and $NH_3$ from streams of air as described in Example III. At 80% RH and 27° C., the EO breakthrough time was 92 minutes. At 15% RH and 27° C., the ammonia breakthrough time was 58 minutes. The above example illustrates that sulfating the binder material increases the $NH_3$ breakthrough time while not significantly affecting the EO breakthrough time.

Example V

H-ZSM-5 particles prepared according to the method described in Example III were evaluated for their ability to filter formaldehyde. 7.5 cm 3 of the 20×40 mesh particles of H-ZSM-5 were placed in the filter tube as described previously. The bed depth was 1.0 cm. The material was pre-humidified overnight in an environmental chamber at 27° C., 80% RH. Moisture pick-up by the material following pre-humidification was less than 0.1 g moisture per g material. Following pre-humidification, the particles were challenged with 1,000 mg/m$^3$ formaldehyde in 80% RH air at a linear velocity of 6 cm/s (contact time=0.33 seconds). The formaldehyde breakthrough time (to 1.2 mg/m$^3$) was 30 minutes. The test was repeated using as-received material and performed in 15% RH air at 27° C. The formaldehyde breakthrough time was 74 minutes.

Example VI 50.0 g of 20×40 mesh ZSM-5 particles prepared in Example III were impregnated to incipient using 50.0 ml of a solution prepared by dissolving 5.0 g of citric acid in 50 ml of DI water. The resulting material was dried at 80° C. to remove the moisture. The resulting material had a nominal citric acid content of 6%.

The resulting 6% citric acid/H-ZSM-5 particles were evaluated for their ability to remove EO and NH$_3$ from streams of air as described in Example III. At 80% RH, the EO breakthrough time was 70 minutes. At 15% RH, the ammonia breakthrough time was 60 minutes. The above example illustrates that adding citric acid to the particles will increase the NH$_3$ breakthrough time while slightly reducing the EO breakthrough time.

The form of the invention described herein represents illustrative preferred embodiments and certain modifications thereto. It is understood that various changes/modifications/additions may be made without departing from the invention as defined in the claimed subject matter that follows.

What is claimed is:

1. A process for removing ethylene oxide from air over a wide range of ambient temperatures and relative humidity conditions, said process comprising:

contacting the air with a zeolite for a sufficient time to remove ethylene oxide.

2. The process of claim 1 wherein the zeolite is acidified.

3. The process of claim 1 wherein the zeolite is impregnated with a compound selected from the group consisting of sulfates, fluorides, chlorides, nitrates, and mixtures thereof.

4. The process of claim 1 wherein the zeolite is selected from the group consisting of ZSM-5, ZSM-8, and ZSM-11.

5. The process of claim 1 wherein the zeolite is impregnated with an organic acid.

6. The process of claim 1 wherein the zeolite is in particle form.

7. A process for the removal of ethylene oxide, ammonia, and/or formaldehyde from air over a wide range of ambient temperatures and relative humidity conditions, said process comprising:

contacting the air with a zeolite for sufficient time to remove ethylene oxide, ammonia, and/or formaldehyde, said zeolite impregnated with a compound selected from the group consisting of sulfates, fluorides, chlorides, nitrates, organic acids, and mixtures thereof.

8. The process of claim 7 wherein the zeolite is selected from the group consisting of ZSM-5, ZSM-8, and ZSM-11.

9. The process of claim 7 wherein the zeolite is in particle form.

* * * * *